(12) United States Patent
Shiraishi

(10) Patent No.: US 7,692,679 B2
(45) Date of Patent: Apr. 6, 2010

(54) FREQUENCY MODULATION APPARATUS AND FREQUENCY MODULATION METHOD

(75) Inventor: Mitsuo Shiraishi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 12/230,716

(22) Filed: Sep. 4, 2008

(65) Prior Publication Data

US 2009/0009582 A1   Jan. 8, 2009

Related U.S. Application Data

(62) Division of application No. 11/878,808, filed on Jul. 27, 2007, now Pat. No. 7,471,308, which is a division of application No. 10/795,336, filed on Mar. 9, 2004, now Pat. No. 7,369,148.

(30) Foreign Application Priority Data

Mar. 11, 2003   (JP)   ............... 2003-064997
Jun. 3, 2003   (JP)   ............... 2003-158104

(51) Int. Cl.
    *B41J 2/435* (2006.01)
(52) U.S. Cl. .................................. 347/249
(58) Field of Classification Search ................ 347/234, 347/235, 237, 247, 248, 249
    See application file for complete search history.

(56) References Cited

U.S. PATENT DOCUMENTS

| | | | |
|---|---|---|---|
| 5,822,105 A | 10/1998 | Kodama et al. | 359/201 |
| 5,909,144 A | 6/1999 | Puckette et al. | 327/551 |
| 5,933,184 A | 8/1999 | Ishigami et al. | 347/249 |
| 6,178,031 B1 * | 1/2001 | Rauch et al. | 359/216.1 |
| 6,310,681 B1 | 10/2001 | Taniwaki | 355/55 |
| 7,369,148 B2 * | 5/2008 | Shiraishi | 347/235 |
| 7,471,308 B2 * | 12/2008 | Shiraishi | 347/235 |

FOREIGN PATENT DOCUMENTS

| | | |
|---|---|---|
| JP | 2-282763 | 11/1990 |
| JP | 3-45074 | 2/1991 |
| JP | 8-258329 | 8/1996 |
| JP | 9-218370 | 8/1997 |
| JP | 11-198435 | 7/1999 |
| JP | 2002-316436 | 10/2002 |

* cited by examiner

*Primary Examiner*—Huan H Tran
(74) *Attorney, Agent, or Firm*—Fitzpatrick, Cella, Harper & Scinto

(57) ABSTRACT

A frequency modulation apparatus capable of reducing a peak level of a radiation noise of a characteristic frequency band due to an image clock.

This frequency modulation apparatus is used in an image formation apparatus having an image bearing body to be scanned by a laser beam, and comprises an auxiliary clock calculating portion for calculating an auxiliary clock period based on a reference clock period and a modulation coefficient, and an image clock generating portion for generating the image clock in which a frequency is different at least in one portion and other portions of an image area on a main scan line to be scanned by the laser beam on said image bearing body based on the initial period value set in advance and said auxiliary clock period, and said image clock generating means perform a frequency modulation so that the frequency of said image clock changes within a predetermined fluctuation.

2 Claims, 15 Drawing Sheets

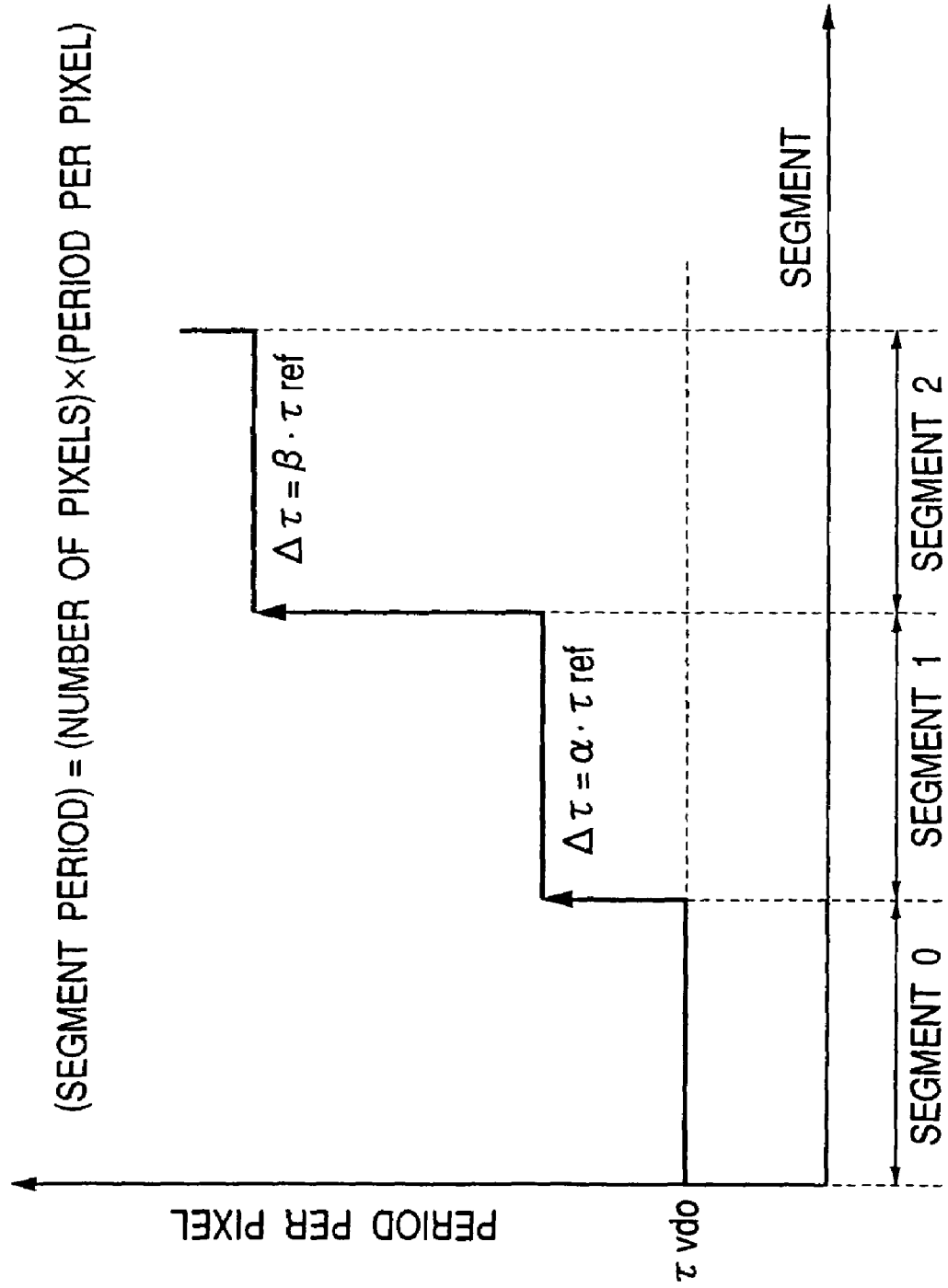

FREQUENCY MODULATION APPARATUS AND FREQUENCY MODULATION METHOD

This application is a division of application Ser. No. 11/878,808, filed Jul. 27, 2008; which was a division of application Ser. No. 10/795,336, filed Mar. 9, 2004, which issued as U.S. Pat. No. 7,369,148 on May 6, 2008, the contents of which are incorporated herein by reference.

BACKGROUND OF THE INVENTION

1. Field of the Invention

The present invention relates to a frequency modulation apparatus and a frequency modulation method, which generate an image clock used for an on/off control of a laser beam scanning on a image bearing body such as a photosensitive drum and the like.

2. Related Background Art

In general, in an image forming apparatus of an electrophotographic system, while laser light emitted from a semiconductor laser is turned on and off, this laser light is scanned by a polygonal rotating mirror (polygon mirror) so as to irradiate a photosensitive body, thereby performing a latent image formation.

In such an image forming apparatus, an image clock of a constant frequency is used for an on/off control of the laser light. The reason why is because, if the frequency of this image clock is not constant, the on/off timing of the laser light deviates from a normal timing, and thereby a dot forming position of an electrostatic latent image formed on the photosensitive body is subtly displaced, and this results in the occurrence of an image distortion, a color drift and a color shading.

Further, between the polygonal mirror and the photosensitive body, there is provided a f-θ lens. This is because the f-θ lens has an optical characteristic such as a corrective operation of a distortion aberration which guarantees a converging operation of the laser light and time linearity of a scans thereby allowing the laser light having passed through the f-θ lens to be joint-scanned on the photosensitive body in a predetermine direction at an equal speed. However, due to a displacement of the characteristic of the f-θ lens, the laser light irradiated on the photosensitive body is sometimes displaced from an ideal image forming position. Hence, a frequency modulation technology is employed, in which this positional displacement of the image due to the f-θ lens characteristic is modulated to match a reference image clock so that the on/off timing of the laser light is subtly adjusted, thereby correcting the position of the dot formed on the photosensitive body (for example, Japanese Patent Application Laid-Open Patent No. H2-282763).

However, when the image clock is always constant, there are often the cases where a radiation noise is generated and the level of the radiation noise exceeds the value defined in the international radiation noise standard in the transmission path in which the on/off signal for turning on/off the laser light is transmitted from the generating circuit to a laser light driving circuit.

Further, when the frequency modulation technology is employed, though the radiation noise level is reduced, in the case where the f-θ lens having a characteristic to such an extent that there is no need for performing the frequency modulation is used, the image clock frequency becomes constant, and therefore, the radiation noise level becomes much severe.

Particularly, in a color image forming apparatus of a tandem system and the like in which the color drift in a main scan direction becomes a problem, the frequency modulation is often used for correcting the characteristic of the f-θ lens, while in the color image forming apparatus of one drum system in which there is no need for being very sensitive about the color drift in the main scan direction or a black and white image forming apparatus in which there is no need for taking into consideration the color drift, the frequency-modulation is scarcely performed, and even in that case, there are often the cases where the radiation noise level exceeds the value of the international radiation noise standard, and this becomes a problem.

SUMMARY OF THE INVENTION

An object of the present invention is to provide a frequency modulation apparatus capable of reducing a peak level of the radiation noise in a characteristic frequency band due to an image clock.

In order to achieve the above-described object, a frequency modulation apparatus used in an image forming apparatus having an image bearing body to be scanned by a laser beam, comprising: an auxiliary clock calculating portion for calculating an auxiliary clock period based on a reference clock period and a modulation coefficient; and an image clock generating portion for generating an image clock in which a frequency is different at least in one portion and other portions of an image area on a main scan line scanned by the laser beam on the image bearing body based on an initial period value provided in advance and said auxiliary clock period; wherein the image clock generating portion performs a frequency modulation so that the frequency of the image clock changes within a predetermined fluctuation range, and an image forming apparatus having such frequency modulation apparatus are provided.

In such a configuration, since a frequency modulation is performed so that an image clock frequency is changed within a predetermined fluctuation range, the peak level of the radiation noise of the characteristic frequency band due to the image clock can be reduced.

Further, by performing the frequency modulation of the image clock, while controlling the influence due to a positional displacement of the image to the minimum, the radiation noise level can be reduced with an image deterioration controlled to the minimum.

Further, by allowing a clock inputted to a PWM-IC to carry a fluctuation, the radiation noise generated in the characteristic frequency band of a conventional reference clock can be reduced, and on top of that, an image forming can be performed without generating the positional displacement of the image due to the fluctuation of the frequency on the image.

The above and other objects, features, and advantages of the invention will become more apparent from the following detailed description taken in conjunction with the accompanying drawings.

BRIEF DESCRIPTION OF THE DRAWINGS

FIG. 5 is a graph showing the relationship between a segment and a period of an image clock 18 within the segment;

DESCRIPTION OF THE PREFERRED EMBODIMENTS

Figure 1:
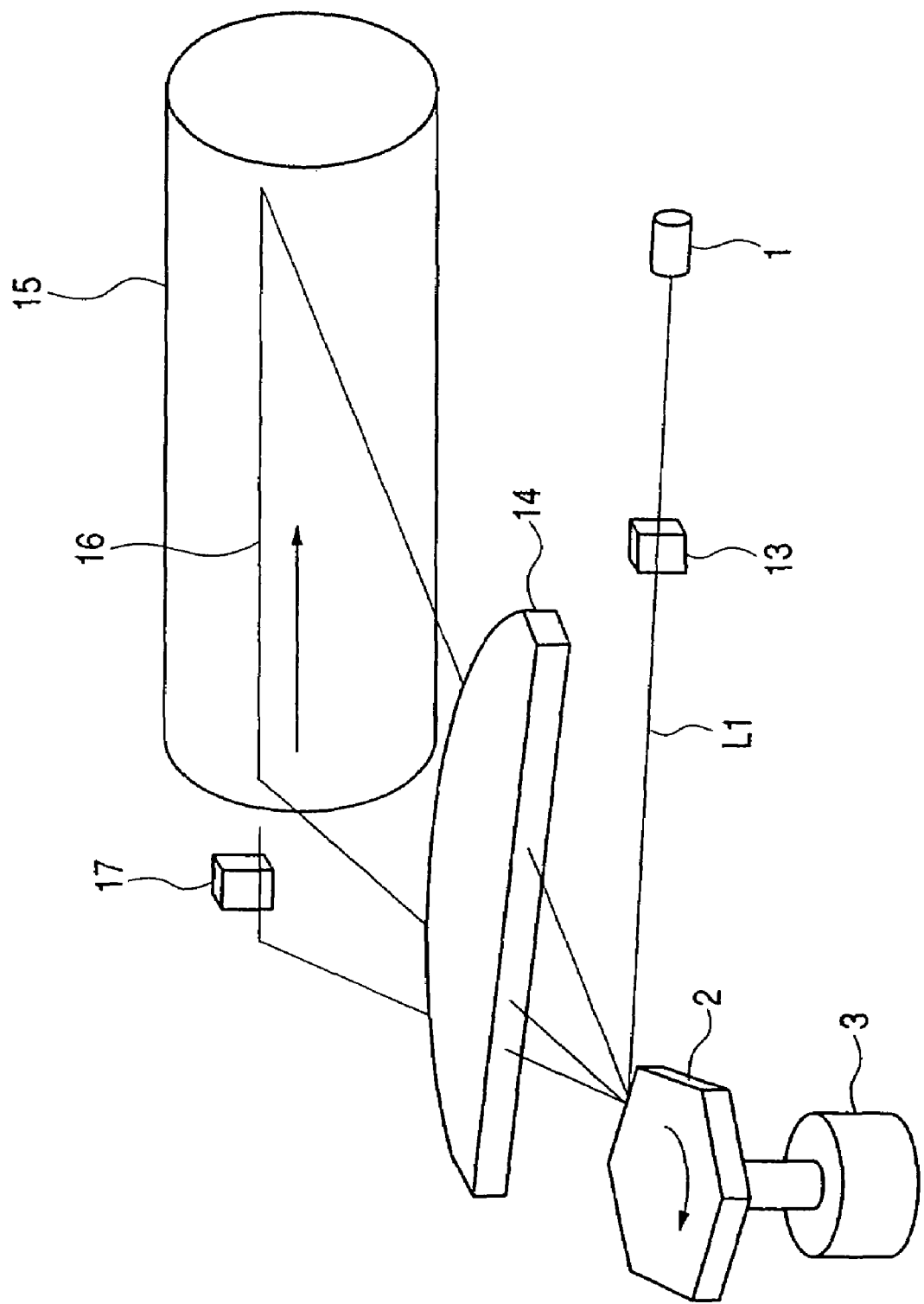
FIG. 1 is a view schematically showing a configuration of an exposure unit of an image forming apparatus according to one embodiment of the present invention.

The present invention will now be described in detail below with reference to the accompanying drawings showing a preferred embodiment thereof. In the drawings, elements and parts which are identical throughout the views are designated by identical reference numeral, and duplicate description thereof is omitted.

The embodiment of the present invention will be described below with reference to the drawings. FIG. 1 is a drawing schematically showing the configuration of an exposure unit of an image formatting apparatus according to one embodiment of the present invention.

An image forming apparatus of an electrophotographic system, as shown in FIG. 1, comprises an exposure unit which irradiates laser light on a photosensitive drum 15 so that a latent image corresponding to an inputted image data is formed on the photosensitive drum 15. This exposure unit comprises a laser light source 1 emitting diffuse laser light. The laser light emitted from the laser light source 1 is converted into collimated laser light L1 through a collimator lens 13, and this laser light L1 is irradiated on a polygon mirror 2, which is in the midst of a rotational driving, by a scanner motor 3. The laser light L1 irradiated on a polygon mirror 2 is reflected by the polygon mirror 2 and reaches a f-θ lens 14.

The laser light having passed this f-θ lens 14 is joint-scanned on the photosensitive drum 15 in a main scan direction at an equal speed, and by a scan, that is, a scan operation of this laser light, the latent image 16 is formed on the photosensitive drum 15. The start of the scan operation of the laser light is detected by a beam detect sensor (hereinafter, referred to as BD sensor) 17. At the time corresponding to the start of the scan of the laser light on the photosensitive drum 15, the laser light source 1 is compulsorily turned on, and the BD sensor 17 detects the laser light reflected and inputted by the polygon mirror 2 in a compulsory light-on period of the laser light source 1, and outputs a beam detect signal (hereinafter, referred to as BD signal) which becomes a reference signal of an image forming write timing for every main scan.

Figure 2:
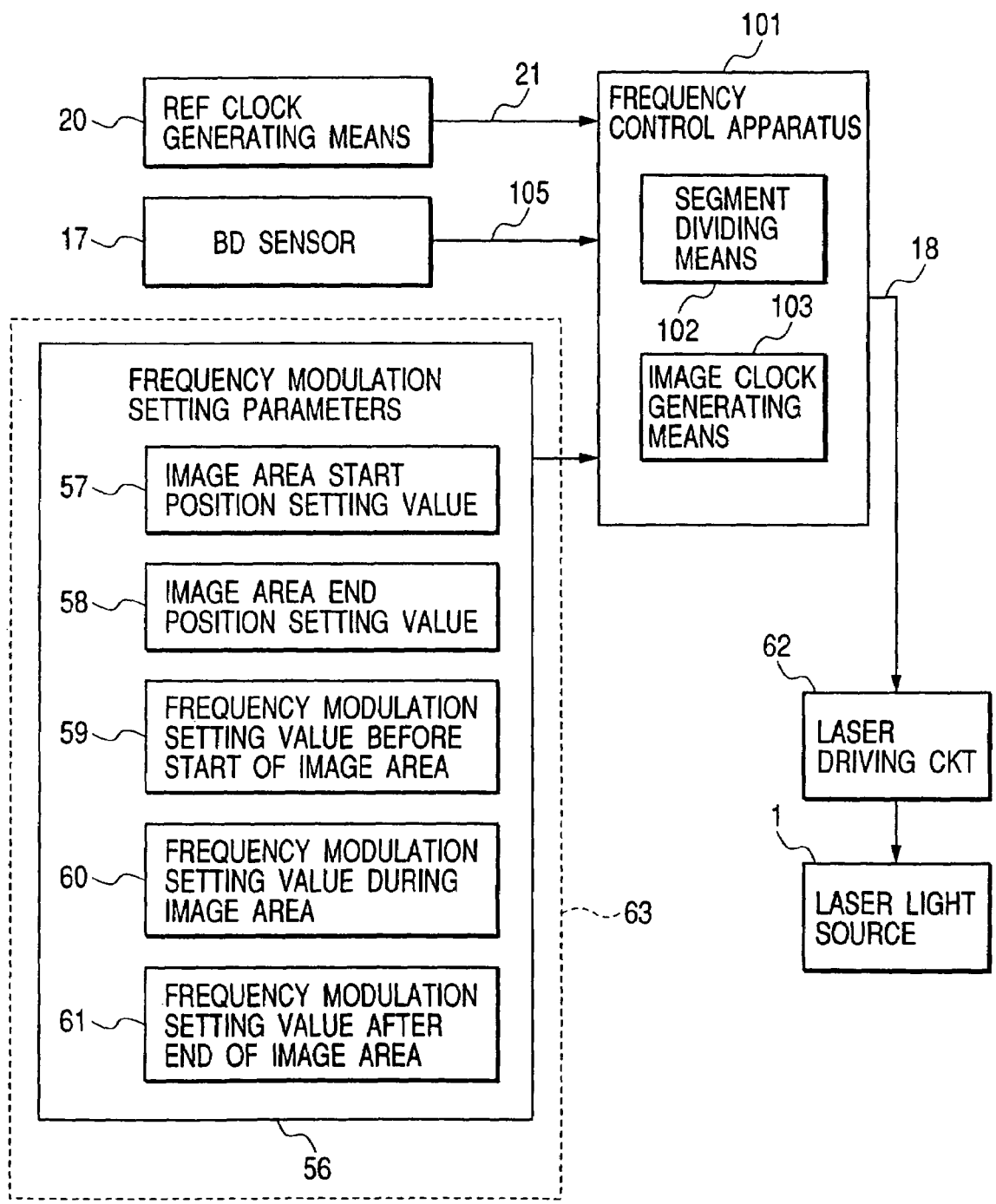
FIG. 2 is a block diagram showing a frequency modulation configuration of an image clock used in a driving control of a laser light source 1.

Next, a frequency modulation configuration of the image clock used for a driving control of the laser light source 1 will be described with reference to FIG. 2. FIG. 2 is a block diagram showing the frequency modulation configuration of the image clock used for the driving control of the laser light source 1.

In the frequency modulation configuration of the image clock used for the driving control of the laser light source 1, as shown in FIG. 2, there are provided reference clock generating means 20 for generating a reference clock 21, a memory 63, and a frequency control apparatus 101. The memory 63 holds a frequency modulation setting parameter 56, and the frequency modulation setting parameter 56 includes various types of setting values necessary for a modulating operation of the image clock signal of the frequency control device (or apparatus) 101. Specifically, included are an image area start position setting value 57, an image area end position setting value 58, a frequency modulation setting value before start of image area 59, a frequency modulation setting value in image area 60, and a frequency modulation setting value after end of image area 61.

The image area start position setting value 57 is a value for setting a period (time) from the input of a BD signal 105 from the BD sensor 17 to the image forming area start timing (image forming area start position) in a main scan direction. The image area end position setting value 58 is a value for setting the period (time) from the input of the BD signal 105 to the image forming area end timing (image forming area end position) in the main scan direction.

Further, the frequency modulation setting value before start of image area 59 is a value for setting the image clock frequency generated by the frequency control device 101 in the period (time) from the input of the BD signal 105 to an image area start timing (image forming area start position) set based on the image area start position setting value 57. The frequency modulation setting value in image area 60 is a value (value for setting a fluctuation amount of the image clock frequency) for setting the image clock frequency generated by the frequency control device 101 in an image area period (time) defined by the image area start timing and the image area end timing set by the image area start position setting value 57 and the image area end position setting value 58. The frequency modulation setting value after end of image area 61 is a value for setting the image clock frequency generated by the frequency control device 101 in the period (time) from the image area end timing set by the image area end position setting value 58 to the input of the BD signal 105 of the next main scan line. These various setting values are transmitted to the frequency control device 101.

The frequency control device 101 comprises segment dividing means 102 for dividing an interior of one line which scans in the main scan direction into a plurality of segments constituted by the arbitrary number of pixels, and image clock generating means 103 for generating the image clock for a plurality of divided segments, respectively. Specifically, the image clock generating means 103 frequency-modulates a reference clock 21 generated by reference clock generating means 104 based on the BD signal 105 as well as the above-described various setting values, and generates an image clock 18. This generated image clock 18 is inputted to a laser driving circuit 62, and the laser drive circuit 62 drivingly turns on/off the laser light source 1 based on the inputted image clock 18 and an image signal.

Figure 3:
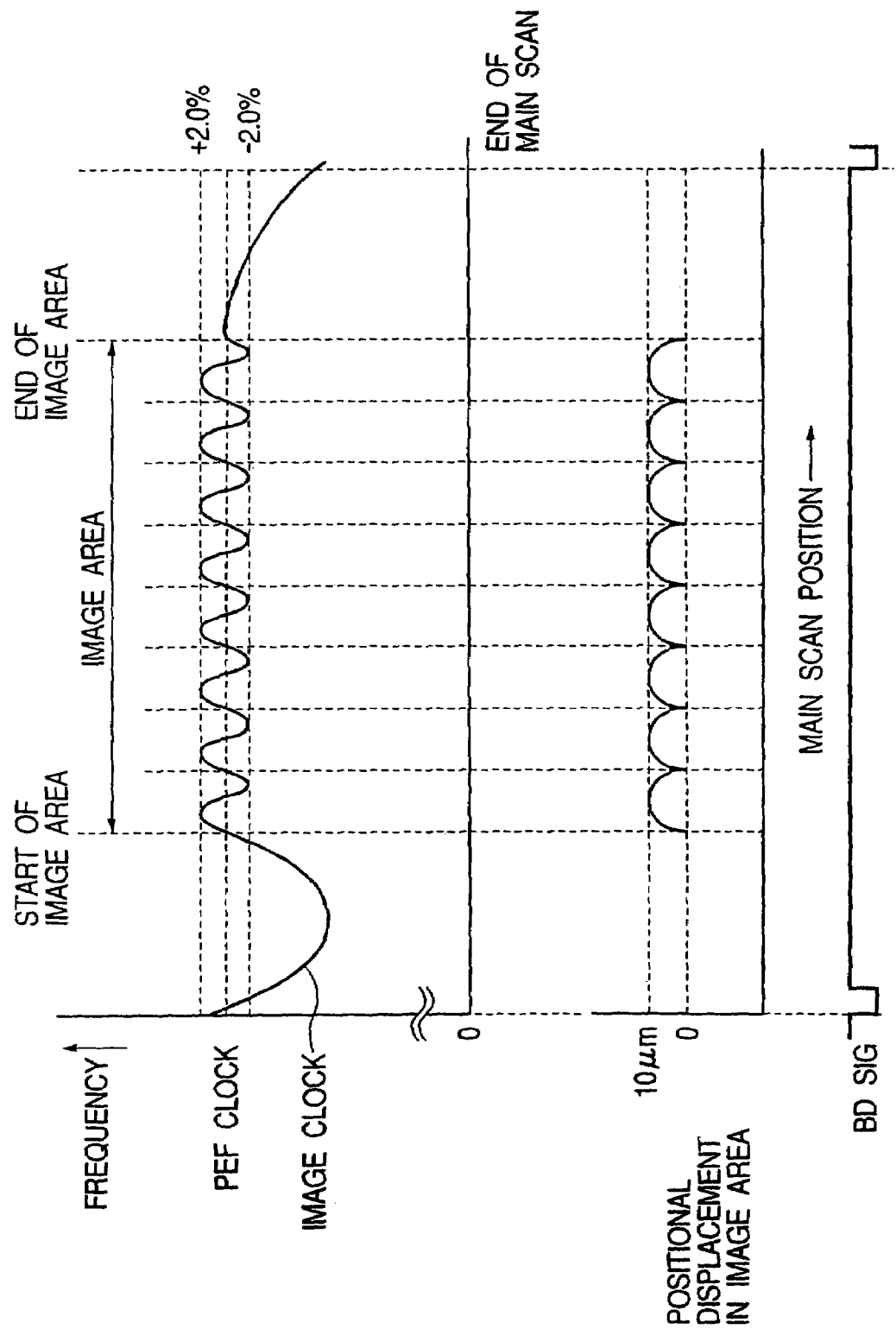
FIG. 3 is a graph showing a relationship between the image clock frequency generated by the frequency modulation circuit configuration of FIG. 2 and a main scan position.

Next, the image clock according to the frequency modulation configuration will be descried with reference to FIG. 3. FIG. 3 is a graph showing the relationship between the image clock frequency generated by the frequency modulation circuit configuration of FIG. 2 and a main scan position.

As shown in FIG. 3, as for the image clock of the period from the BD signal 105 to the image area start (image area start position), the image clock having a frequency sharply displaced against the frequency of the reference clock 21 is used. This is because, in the area other than the image area, there is no need for the frequency which is correct and a constant clock since no image formation is made on the photosensitive drum 15. In this way, the sharp displacement of a frequency in the above described period is effective for reducing the peak level of the radiation noise in the characteristic frequency band due to the image clock. Further, even in the period from the image end area (END) to the inputting of the next BD signal, an image clock having a frequency substantially different that of the reference clock is similarly used. This is due to the same reason as applied to the period from the BD signal 105 to the image area start (image area start position), and is effective for reducing the peak level of the radiation noise in the characteristic frequency band due to the image clock.

Next, a frequency setting in the image area as shown in FIG. 3 will be described.

In the image area, when the image clock is used, in which a frequency is displaced more than necessary against the reference clock 21, there occurs a displacement in which the image forming position on the photosensitive drum 15 is displaced from a normal position (ideal position). However, when the image clock is put into a state, in which there hardly exists a fluctuation, though the displacement of the image forming position disappears, it is not possible to reduce the peak level of the radiation noise in the characteristic frequency band due to the image clock.

Hence, in the present embodiment, a method for generating the image clock is used in which the reference clock 21 is frequency-modulated so that image deterioration due to the displacement of the image forming position is controlled to be at or below 10 μm (unrecognizable by naked eyes). That is, in order that the displacement of a local image forming position due to the frequency modulation being performed more than necessary is controlled within a range difficult to confirm by the naked eye and also the radiation noise level due to the image clock is reduced, the image clock is generated, in which the image clock frequency has the fluctuation within the frequency range of ±2% or less for the frequency of the reference clock 21. The fluctuation amount of this image clock is set for every segment which is divided by the segment dividing means 102 based on the frequency modulation setting value in image area 60.

Further, it is preferable that a fluctuation component is, as shown in FIG. 3, set so that a main scan magnification fluctuation of the image due to a fluctuation component of the frequency in the image area period is set off by the image area period. In this way, the main scan magnification fluctuation of the whole image is not generated. However, though a variable-magnification of the write position is slightly generated due to the fluctuation component between the image area periods, since this is a level visually unseeable (insensitive), the image deterioration is not invited.

Figure 4:
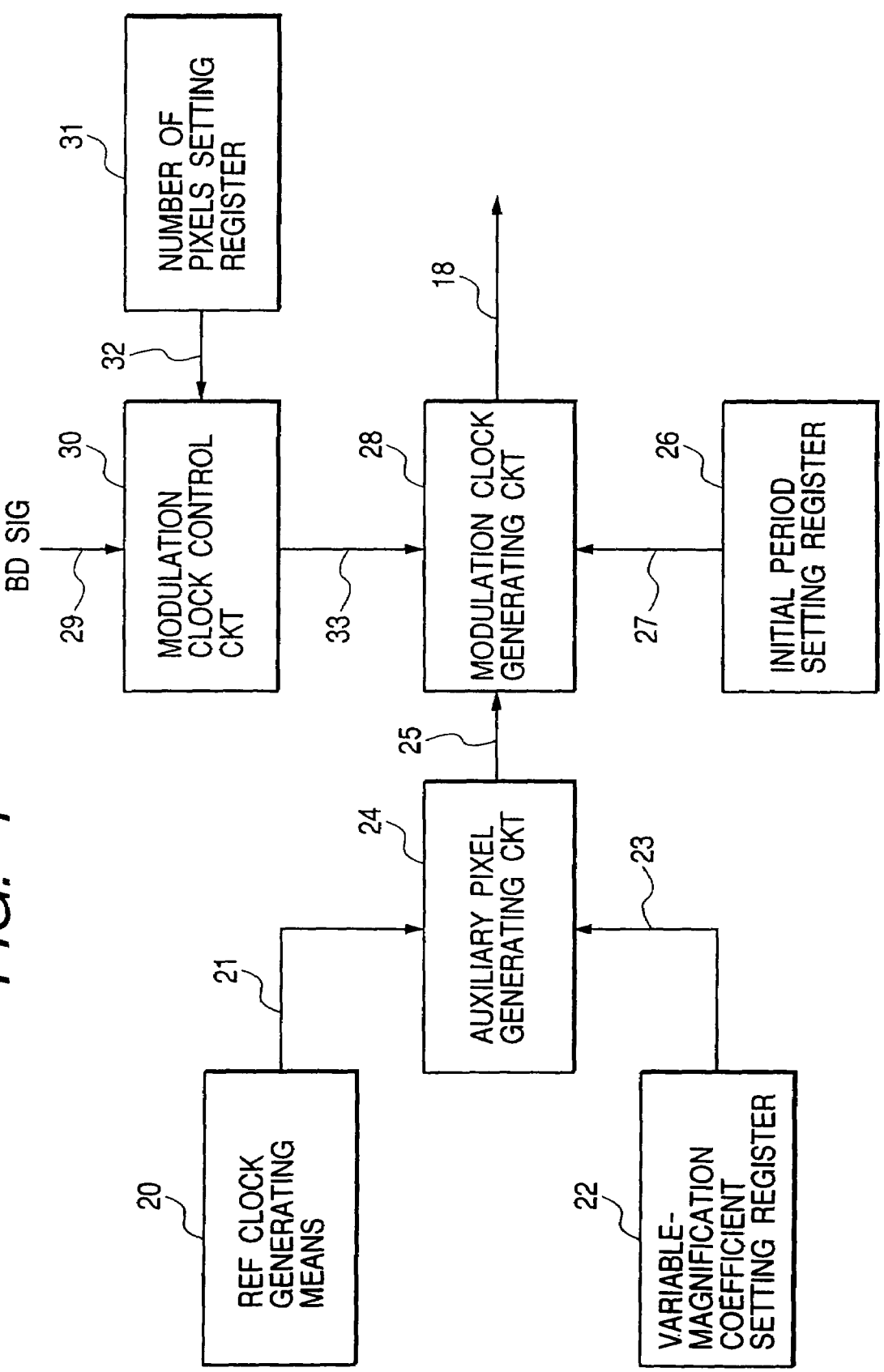
FIG. 4 is a block diagram showing an internal configuration of a frequency control device 101 of FIG. 2.

Here, an internal configuration of the frequency control device 101 and the image clock generated by the same will be described below with reference to FIGS. 4, 5 and 6. FIG. 4 is a block diagram showing the internal configuration of the frequency control device 101 of FIG. 2, FIG. 5 a graph showing the relationship between the segment and a period of the image clock 18 within the segment, and FIG. 6 a graph showing the relationship when a period of the image clock 18 within the segment is varied at multi-steps.

The frequency control device 101, as shown in FIG. 4, comprises a variable-magnification coefficient setting register 22, an auxiliary pixel generating circuit 24, an initial period setting register 26, a modulation clock control circuit 30, a number of pixels setting register 31, and a modulation clock generating circuit 28, and these circuits and registers constitute segment dividing means 102 and image clock generating means 103.

The variable-magnification coefficient setting register 22 stores a variable-magnification coefficient 23 for varying a period ratio of the reference clock 21 generated from reference clock generating means 104. The auxiliary pixel generating circuit 24 generates an auxiliary pixel period 25 based on the reference clock signal 21 and the variable-magnification coefficient 23. By this auxiliary pixel period 25, a main scan magnification is corrected. That is, since a dot width or a dot interval of the main scan on the photosensitive drum 15 does not become uniform due to the optical system of the polygon mirror 2 and the f-θ lens 14 of FIG. 1, the correction of the image clock frequency in one scan period is performed using the auxiliary pixel period 25 so that the dot width or the dot interval becomes uniform. For example, in the case of a rotational scan system such as the polygon mirror 2, both end portions in the main scan direction of the photosensitive drum 15 tend to be fast in a scan speed, and in reverse, a central portion in the main scan direction of the photosensitive drum 15 tends to be slow in the scan speed. Hence, by speeding up the image clock frequency in the vicinity of both end portions of the photosensitive drum 15 and correcting the image clock frequency of the central portion of the photosensitive drum 15 to be slow, it is possible to allow the dot width or the dot interval on the photosensitive drum 15 to be uniform.

Here, in the frequency control device 101, it is possible to execute either one of a first control method for dividing one main scan line into a plurality of segments and generating a constant image clock 18 for every segment or a second control method for performing the frequency modulation of the image clock within each of the divided segments.

First, the first control method for dividing one main scan line into a plurality of segments and generating a constant image clock 18 for every segment will be described with reference to FIG. 5.

For example, where the period of the reference clock signal 21 is taken as τref, the variable-magnification coefficient 23 as αk, and a period of the auxiliary pixel period 25 as Δτ, Δτ is represented by the following expression (1):

$$\Delta\tau = \alpha k \cdot \tau\text{ref} \qquad (1)$$

Here, the variable-magnification coefficient 23 (=αk) is set to such a value that the period Δτ becomes sufficiently shorter than the period of the image clock 18.

The initial period setting register 26 stores an initial value 27 (τvdo) of the period of the image clock 18 outputted from the modulation clock generating circuit 28.

A modulation clock control circuit 30 divides the interior of one line, which scans in the main scan direction, into the segments constituted by the arbitrary number of pixels and forms a plurality of segments. Based on the frequency modulation setting value in image area 60, the modulation clock control circuit 30 keeps control so that the image clock period has a predetermined range of fluctuation within each segment. The number of pixels within the segment is set by a number of pixels setting value 32 within the number of pixels setting resister 31. The number of pixels between each segment may be either the same or different number.

Here, the detail of the operation of the modulation clock control circuit 30 will be described. The modulation clock control circuit 30 generates a modulation clock control signal 33 for an initial segment (segment 0) when the BD signal 105, which is outputted from the BD sensor 17 and becomes a write reference, is inputted, and outputs the control signal 33 to the modulation clock generating circuit 28. The modulation clock generating circuit 28 which receives this modulation clock control signal 33 outputs the image clock 18 of the initial period 27 ($\tau$vdo).

For the next segment (segment 1), the modulation clock control circuit 30 generates the modulation clock control signal 33 for the next segment (segment 1), and outputs the control signal 33 to the modulation clock generating circuit 28. The modulation clock generating circuit 28 which receives this modulation clock control signal 33 generates a modulation clock signal $\Delta T1$ having a period represented by the following expression (2) as the image clock 18 based on the auxiliary pixel period 25 and the initial period 27 ($\tau$vdo):

$$\Delta T1 = \tau vdo + \alpha \cdot \tau ref \quad (2)$$

Here, $\alpha$ is a variable modification coefficient for the segment 1.

Similarly, further for the next segment (segment 2), the modulation clock control circuit 30 outputs the modulation clock control signal 33 for the next segment (segment 2) to the modulation clock generating circuit 28. The modulation clock generating circuit 28 which receives this modulation clock control signal 33 generates a modulation clock signal $\Delta T2$ having the period represented by the following expression (3) as the image clock 18 based on the auxiliary pixel period 25 and the initial period 27 (=$\tau$vdo):

$$\Delta T2 = \tau vdo + \alpha \cdot \tau ref + \beta \cdot \tau ref \quad (3)$$

Here, $\beta$ is a variable modification coefficient for the segment 2.

Further, even in the case where more segments are available after the segment 2, modulation clock signals are generated for those segments available by the similar procedure, and are outputted as the image clock 18.

As described above, by the control of the modulation clock control circuit 30, the image clock 18 having a plurality of periods in the interior of one main scan line is outputted from the modulation clock generating circuit 28.

Next, the second control method for performing the frequency modulation of the image clock within each segment will be described with reference to FIGS. 6A and 6B.

Figure 6A:
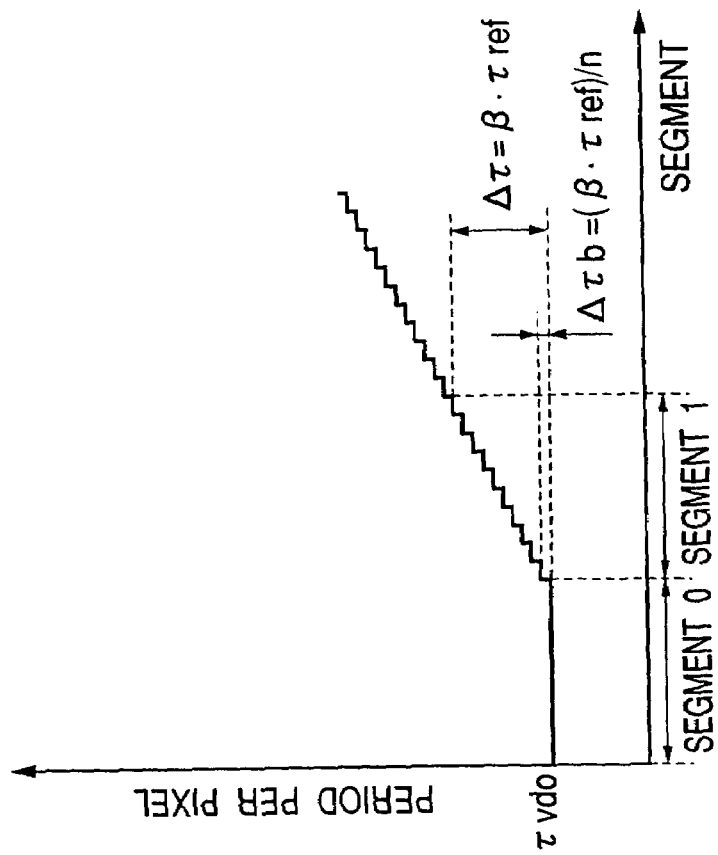
FIGS. 6A and 6B are graphs showing the relationship when the period of the image clock 18 within the segment is varied at multi-steps.

In the case where the frequency of the image clock 18 is varied from the initial segment (segment 0), as shown in FIG. 6A, when an initial period is taken as $\tau$vdo, the number of pixels for every one segment as n, a modulation coefficient (segment 0) as $\alpha$, and a reference clock period as $\tau$ref, the period $\Delta\tau a$ for every one pixel at the segment 0 and the total periods $\Delta T0$ of the segment 0 are represented by the following expressions (4) and (5):

$$\Delta\tau a = (\alpha \cdot \tau ref)/n \quad (4)$$

$$\Delta T0 = \tau vdo + \{n \cdot (n+1)/2\} \cdot \{(\alpha \cdot \tau ref)/n\} = \tau vdo + \{(n+1)/2 \cdot (\alpha \cdot \tau ref)\} \quad (5)$$

Figure 6B:
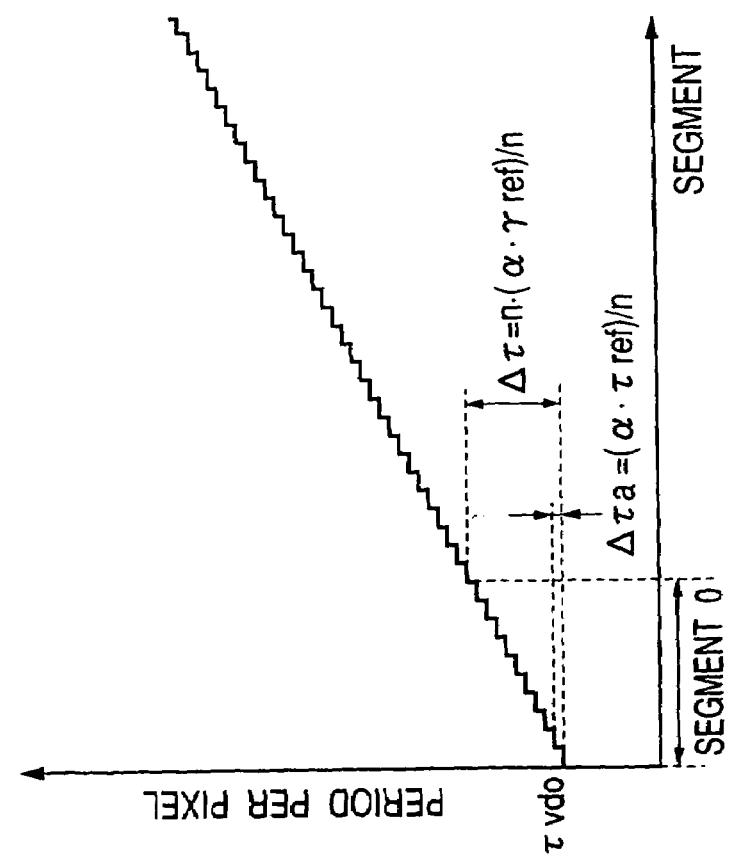

In the case where the frequency of the image clock 18 of the initial segment (segment 0) is fixed and the frequency of the image clock 18 of subsequent segments is varied, as shown in FIG. 6B, when the total periods of the segment 0 are taken as $\Delta T0$, they are expressed by the following expression (6):

$$\Delta T0 = n \cdot \tau vdo \quad (6)$$

On the other hand, for the next segment of the initial segment, that is, the segment 1, when the modulation coefficient (segment 1) is taken as $\beta$, and the reference clock period as $\tau$ref, the period $\Delta\tau b$ for every one pixel at the segment 1 and the total periods $\Delta T1$ of the segment 1 are expressed by the following expressions (7) and (8):

$$\Delta\tau b = (\beta \cdot \tau ref)/n \quad (7)$$

$$\Delta T1 = \tau vdo + \{n \cdot (n+1)/2\} \cdot \{(\beta \cdot \tau ref)/n\} = \tau vdo + \{(n+1)/2\} \cdot (\beta \cdot \tau ref) \quad (8)$$

With respect to each segment after that, the period $\Delta\tau b$ for every one pixel and the total periods $\Delta Tn$ ($n\geq 2$) of each segment can be expressed by the similar expression.

Figure 7:
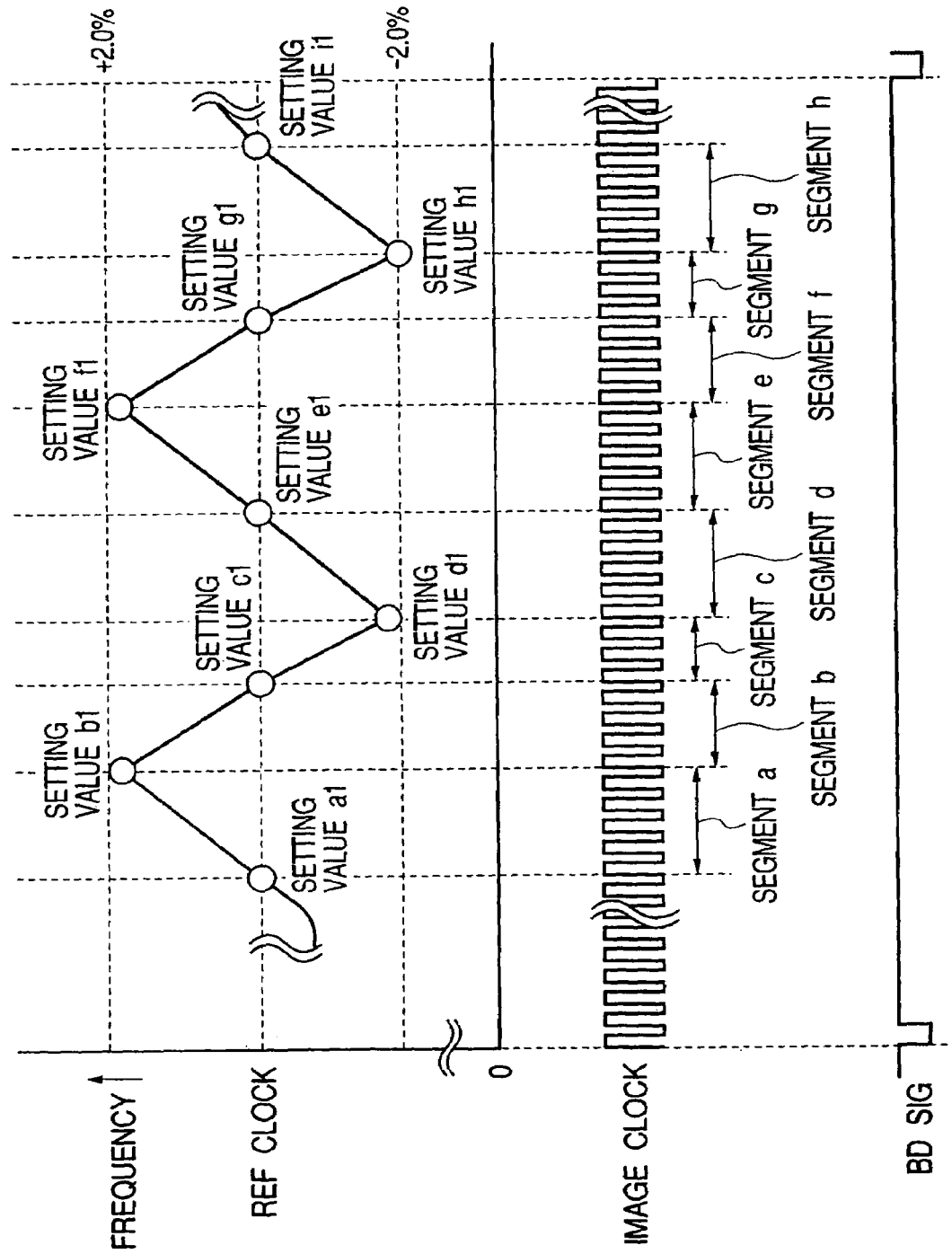
FIG. 7 is a graph showing a change of the image clock frequency when a second control method is performed.

Next, the change of the image clock frequency will be specifically described with reference to FIG. 7, where the above described second control method is performed. FIG. 7 is a graph showing the change of the image clock frequency when the second control method is performed. This drawing is enlarged in a part of the image area so that a frequency setting particularly in the image area can be easily understood.

First, the frequency modulation setting value in image area 60 within the memory 63 is transmitted to the frequency control device 101. Here, the frequency modulation setting value in image area 60 includes the frequency setting value for every segment, and the segment dividing means 102 divides the image area into a plurality of segments according to the number of frequency setting values included in the frequency modulation setting value in image area 60. In the present embodiment, a predetermined count interval, in which the image clock is set as a count value, is taken as one segment.

As shown in FIG. 7, in a segment a, the image clock generating means 103 modulates and controls the frequency so that the frequency setting value b1 is connected from the frequency setting value a1 by a straight line. Subsequently, in a segment b, the image clock generating means 103 modulates and controls the frequency so that the frequency setting value c1 is connected from the frequency setting value b1 by the straight line. For the subsequent segments, the similar control is made. In this way, by controlling the frequency for each segment, the image clock is allowed to carry a fluctuation for the reference clock. Hence, the peak level of the radiation noise in the characteristic frequency band due to the image clock can be reduced.

Figure 8:
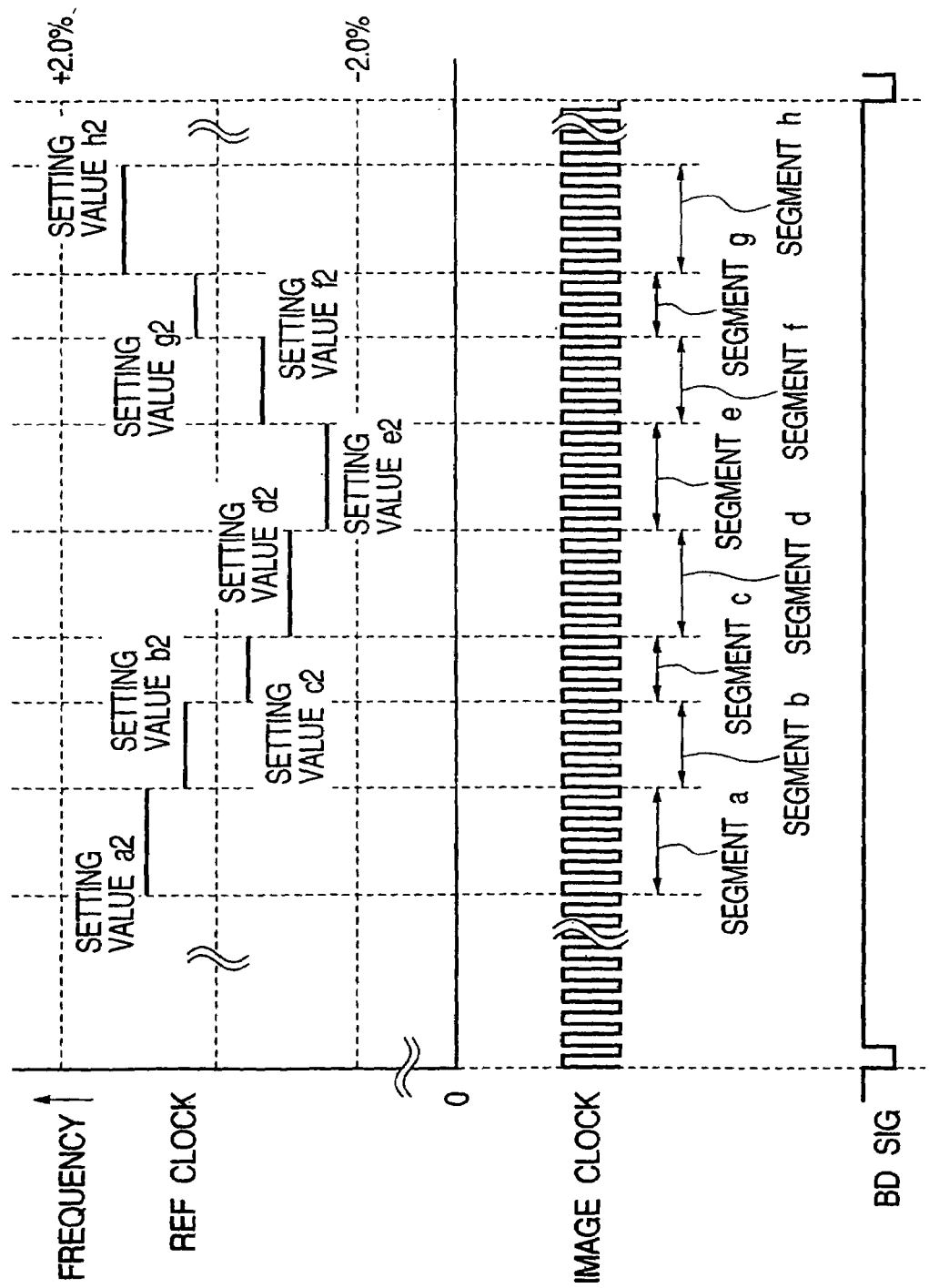
FIG. 8 is a graph showing the change of the image clock frequency when a first control method is performed.

Next, the change of the image clock frequency when the above-described first control method is performed will be specifically described with reference to FIG. 8. FIG. 8 is a graph showing the change of the image clock frequency when the first control method is performed.

In the case of the present embodiment, the segment is set similarly with FIG. 7. In the case of the present embodiment, though the frequency setting value within the segment is constant, a different frequency is set between each segment so that the reference clock is allowed to carry a fluctuation. In this way, the peak level of the radiation noise in the characteristic frequency band due to the image clock can be reduced.

Figure 9:
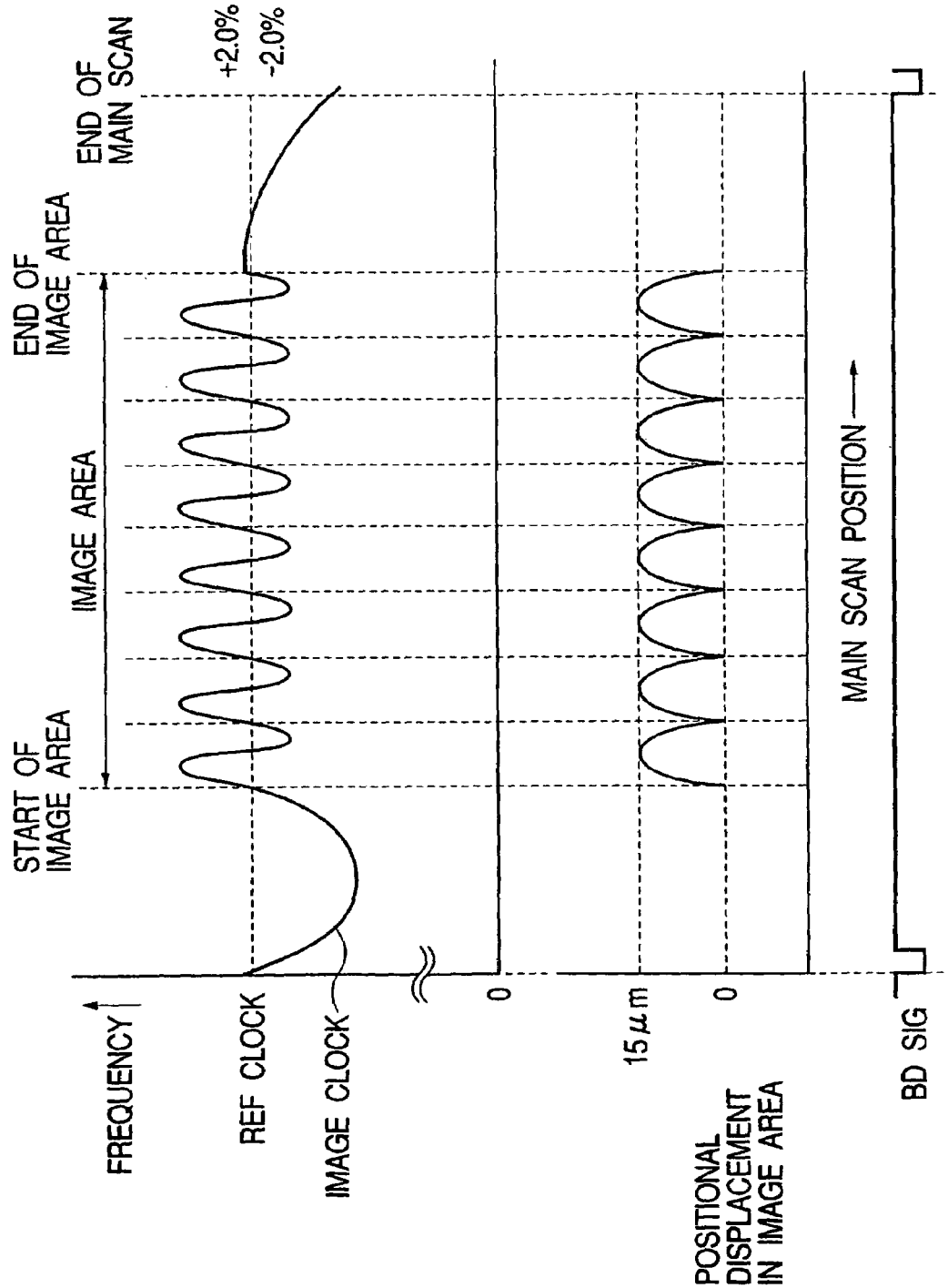
FIG. 9 is a graph showing the change of the image clock frequency in a main scan direction when a yellow latent image is formed and a yellow toner image is obtained.

Next, in the color image forming apparatus, the image clock frequency setting in the main scan direction will be described with reference to FIG. 9, where a yellow latent image is formed and a yellow toner image is obtained. FIG. 9 is a graph showing the change of the image clock frequency in the main scan direction when the yellow latent image is formed and the yellow toner image is obtained.

In this case, a modulation ratio of the frequency in the image area is large against other colors, and a displacement amount of the image is controlled so as to become 15 μm or less. The reason why is because, when a color image is obtained in an electrophotographic color image forming apparatus, it is prevalent to obtain a full color image by superposing toner images of four colors of Yellow, Magenta, Cyan and Black so as to form an image. At this time, the color drift by the displacement of a yellow image position is wide in latitude comparing to other colors, and while the other colors are visually recognizable at 10 μm in the color drift, in the case of Yellow color, it is possible to visually recognize the color drift only at 15 μm. Hence, in the present embodiment, by making the most of the above-described visual characteristic during a yellow image formations a fluctuation is provided for the frequency for the frequency setting in the main scan image area within an allowable range of generating a positional displacement of the image up to 15 μm. For example, during the yellow image formation, the image clock frequency in the main scan direction is changed as shown in FIG. 9. Hence, during the yellow image formation, the radiation noise level of the characteristic frequency band generated due to the image clock can be further reduced.

In this way, in the present embodiment, since the frequency modulation is performed so that the image clock frequency is changed within a predetermined fluctuation range, the peak level of the radiation noise of the characteristic frequency range due to the image clock can be reduced.

Further, in the color image forming apparatus of one drum system in which the performance of the f-θ lens is too good to perform the frequency modulation or there is no need to be very sensitive about the color drift in the main scan direction, or again in the black and white image forming apparatus in which there is no need to be sensitive about the color drift, there is scarcely any need to perform the frequency modulation. Even in such a case, though there have been many cases where the radiation noise level exceeds the international radiation noise standard, in the present embodiment, by performing the frequency modulation of the image clock while controlling the influence due to the positional displacement of the image to the minimum, it is possible to reduce the radiation noise level with the image deterioration controlled to the minimum.

Further, it is possible to constitute the configuration including the whole or a part of the block which forms the above-described frequency control device 101 or the configuration including a block in the vicinity thereof as ASIC or other integrated circuits.

Figure 10:
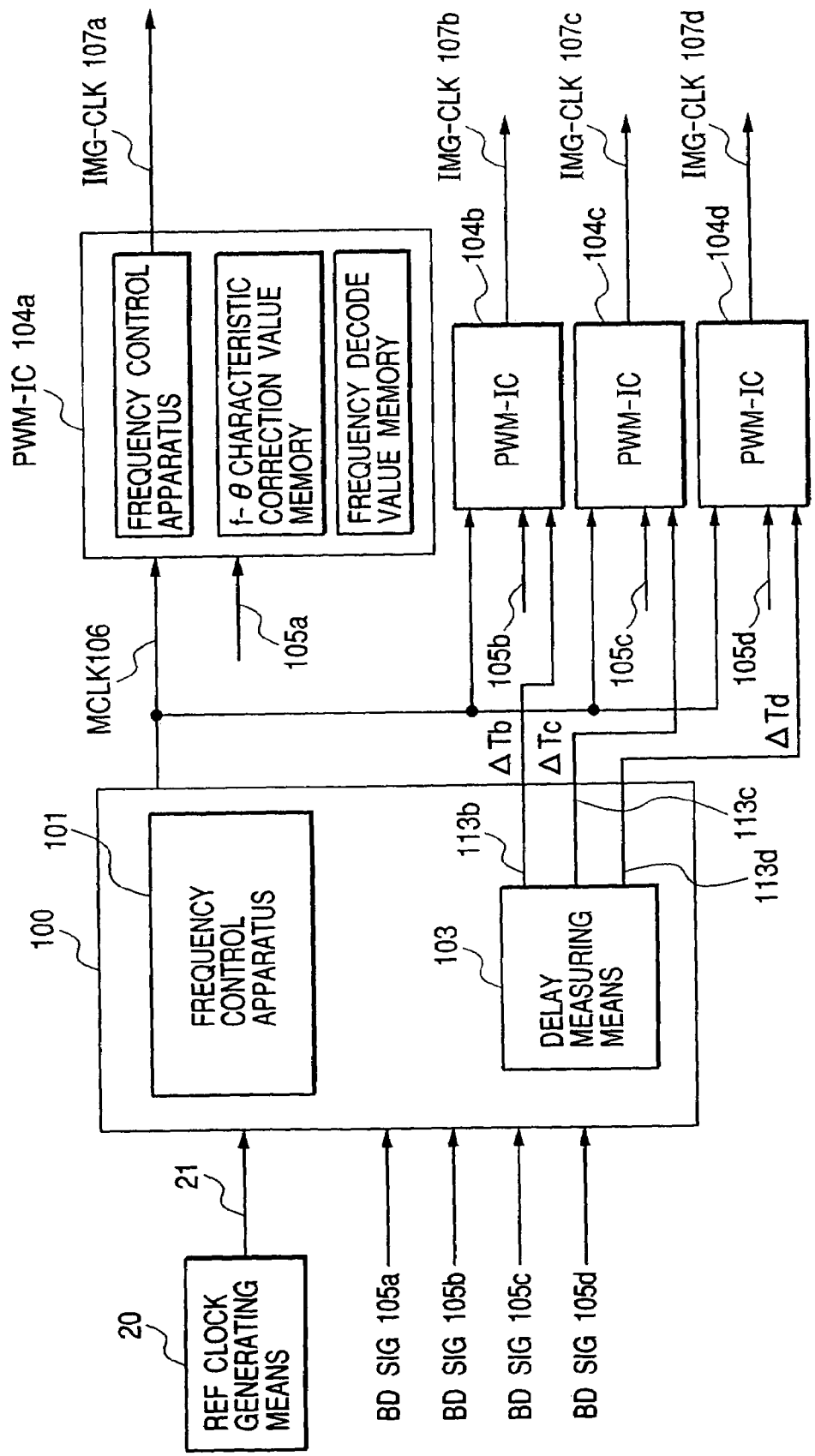
FIG. 10 is a block diagram showing the frequency modulation configuration according to one embodiment of the present invention.

Next, the frequency modulation configuration of the image clock used in the driving control of the laser light source 1 will be described further in detail with the reference to FIG. 10. FIG. 10 is a block diagram showing the frequency modulation configuration of the image clock used in the driving control of the laser light source 1, and is one example of the circuit in the image forming apparatus of four-drum system in which four sets each of the photosensitive body and exposure means, that is, four configurations of FIG. 10 are mounted in tandem.

In the frequency modulation configuration of the image clock used in the driving control of the laser light source 1, as shown in FIG. 10, there are provided the reference clock generating means 20 for generating the reference clock 21 which becomes a reference to keep a constant frequency, an image control circuit 100, and PWM-IC 104a to 104d. In the image control circuit 100, there are provided the frequency control device 101 and the DELAY measuring means 103.

Note that the internal configuration of the frequency control device 101 and the image clock generated by the same are same as described above.

The frequency modulation configuration of the image clock used in the driving control of the laser light source 1 will be described with reference to FIG. 10. Among the BD signals 105a, 105b, 105c and 105d inputted to the image control circuit 100, and this BD signal is inputted as the BD signal 105 of FIG. 4, and generates the MCLK 106 generated by the first frequency control device 101 shown in FIG. 2. In order to reduce the radiation noise in the characteristic frequency band due to the reference clock, the MCLK is a clock in which a fluctuation is provided in the frequency by carrying a specific period located in the reference clock 21, and a fluctuation amount of the specific period and the frequency is set in advance in a register of the frequency control device 102, and according to that set value, the reference clock is modulated and outputted.

The DELAY measuring means 103 inputs the BD signals 105a, 105b, 105c and 105d obtained respectively from the BD sensor 17 of four exposure devices, and measures a DELAY amount of other BD signals for the BD signal 105a which becomes the reference BD signal of the frequency control device 101, and transmits the measuring result to three PMW-IC 104b to 104d, respectively.

The PWM-IC 104a to 104d generates image clock IMG_CLK 107a to 107d based on the measuring result from the inputted MCLK 106 and each BD signal 105a to 105d and the DELAY measuring means 103. A frequency decode value memory located within the PWM-IC 104a to 104d holds a correction coefficient for decoding a frequency setting set in the frequency control means 101 of the image control circuit 100 and applying a frequency correction to the same so that it becomes approximately the reference clock 21. Based on each BD signal and the delay amount from the reference BD signal 105a, outputted from said DELAY measuring means, a data read address is displaced by the delayed portion of the reference BD signal 105a stored in the frequency decode value memory, so that, by this correction coefficient, it is possible to generate a clock approximately close to the reference clock 21 by the frequency control device mounted also inside the PWM-IC.

Further, the PWM-IC 104a to 104d are mounted with a f-θ characteristic correction value memory for correcting a characteristic irregularity of the f-θ lens mounted in each exposure unit, and by further correcting the characteristic of this f-θ lens to the image clock approximately decoded by the reference clock, it is possible to align the image forming position on the photosensitive body with a high accuracy.

Figure 11:
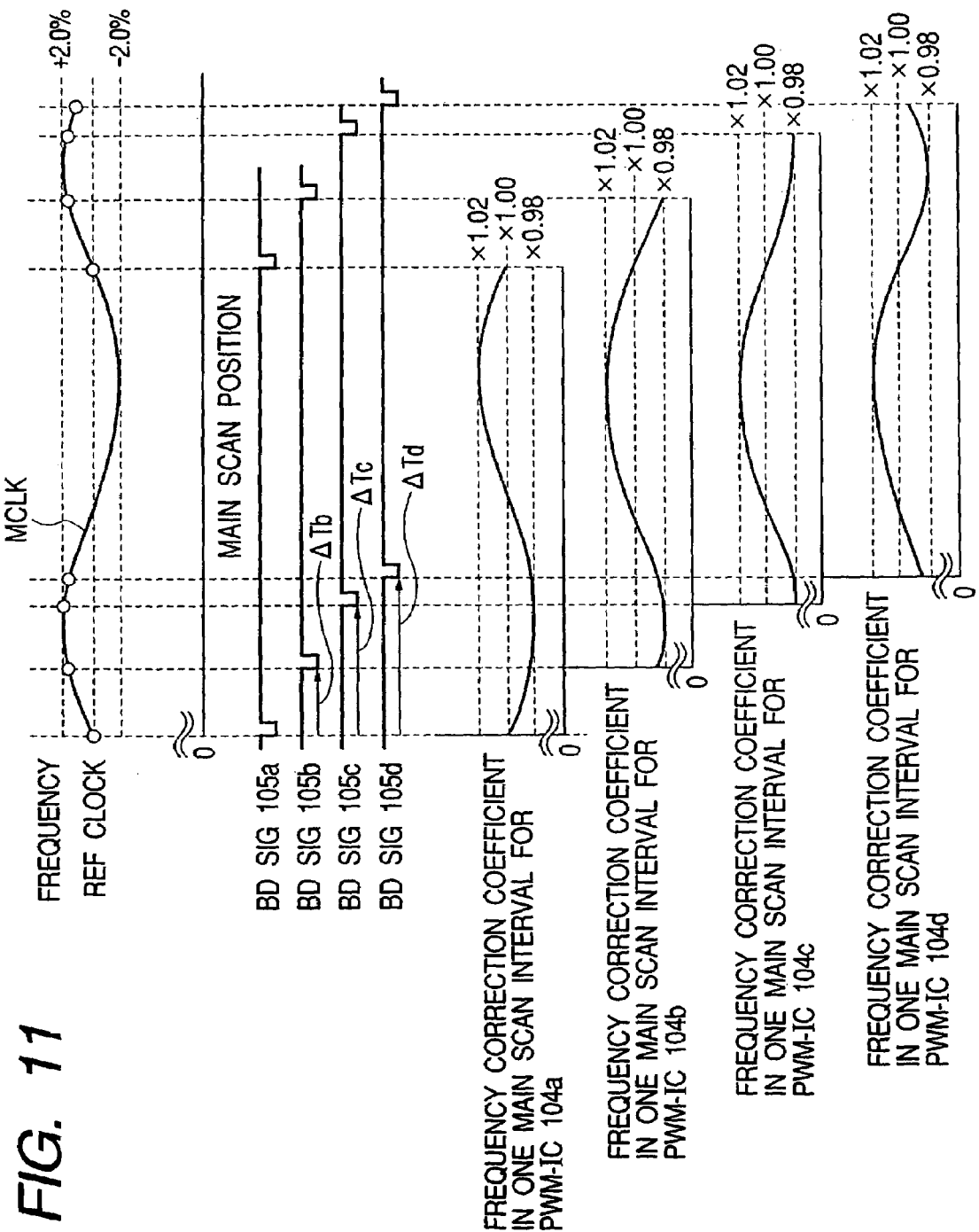
FIG. 11 is a graph shown about a generation of a frequency correction coefficient for a MCLK 106 and a MCLK 106 within a PWM-IC.

FIG. 11 is a graph about the MCLK 106 generated in FIG. 10 and the generation of the frequency correction coefficient for the MCLK 106 within the PWM-IC of FIG. 10.

Figure 12:
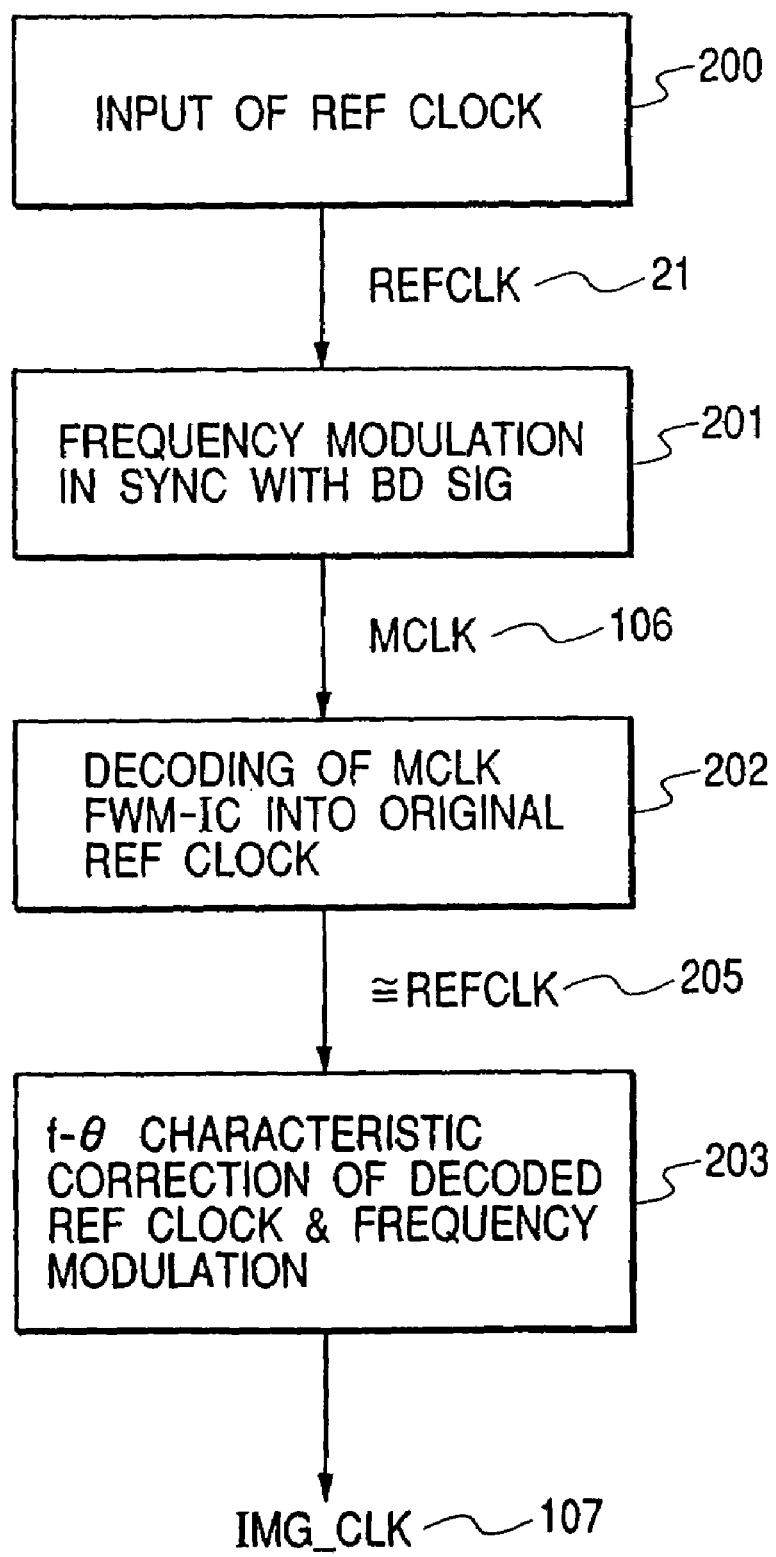
FIG. 12 is a block diagram illustrating a clock flow generated in the circuit configuration of FIG. 10.

FIG. 12 is a block diagram illustrating a clock flow generated in the circuit configuration of FIG. 10. The reference clock (REFCLK) 21 inputted from a reference clock input 200 is modulated to a frequency 201 synchronized with the BD signal, and generates the MCLK 106. The generated MCLK 106 is decoded 202 into the frequency approximately close to the reference clock within the PWM-IC, and based on this clock 205, the correction coefficient of the f-θ characteristic is further applied and the frequency is modulated 203, thereby obtaining the IMG_CLK 107.

Figure 13:
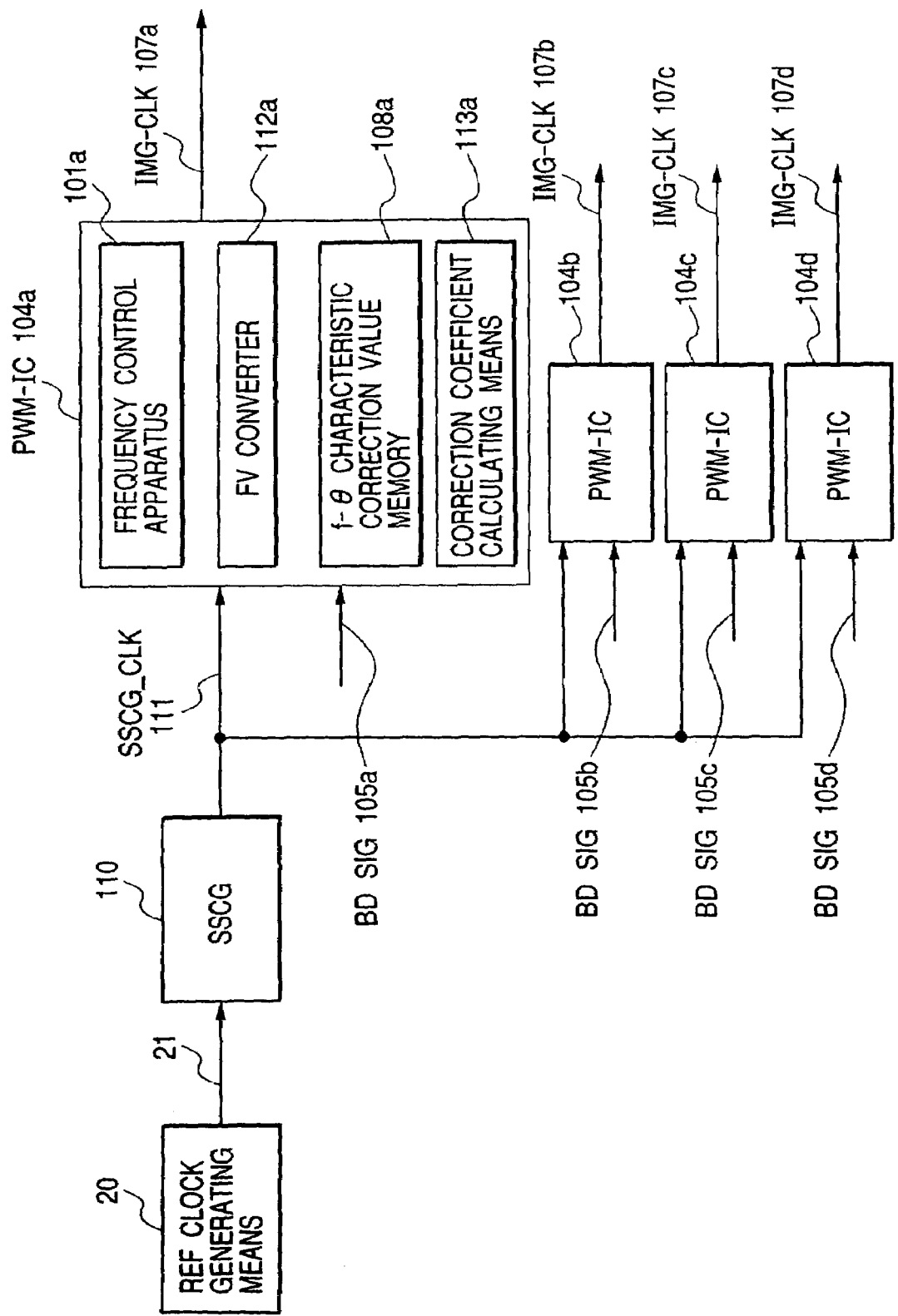
FIG. 13 is a block diagram showing the frequency modulation configuration according to another embodiment of the present invention.

Next, another embodiment of the present invention will be described with reference to FIG. 13. FIG. 13 shows a circuit configuration in another embodiment of the present invention.

First, the reference clock 21 having a constant frequency generated by the reference clock generating means 20 is inputted to a spread spectrum clock generator 110 (hereinafter, abbreviated as SSCG). This SSCG 110 is a device which adds a fluctuation to the frequency of the inputted reference clock 21, and this allows the radiation noise in the frequency range due to the reference clock 21 to be reduced. The SSCG_CLK 111 generated by this SSCG 110 is inputted to PWM-IC 104a, 104b, 104c and 104d provided for the laser of respective exposure units. Here, by using the PWM-IC 104a, the internal circuit configuration will be further described. First, within the PWM-IC 104a, the SSCG-CLK 111 is inputted to an FV converter 112a and converts the frequency into a voltage value. From this voltage value, the frequency is measured to see how much it is displaced form the reference clock, and based on this measurement result, a correction coefficient is decided by correction coefficient calculating means 113a so that the displaced portion from the reference clock is corrected, and the correction coefficient is multiplied by the SSCG_CLK 111 in the frequency control device 101 within the PWM-IC 104a, so that a clock approximately equal to the reference clock 21 can be obtained. Further, here also, similarly with the embodiment of FIG. 10, the PWM-IC 104 is further mounted with a f-θ lens characteristic correction value memory 108a for correcting the characteristic irregularity of the f-θ lens mounted on each exposure unit, and by correcting the characteristics of the f-θ lens further to the image clock approximately decoded to the reference clock, it is possible to align the image forming position on the photosensitive body with a high accuracy.

Figure 14:
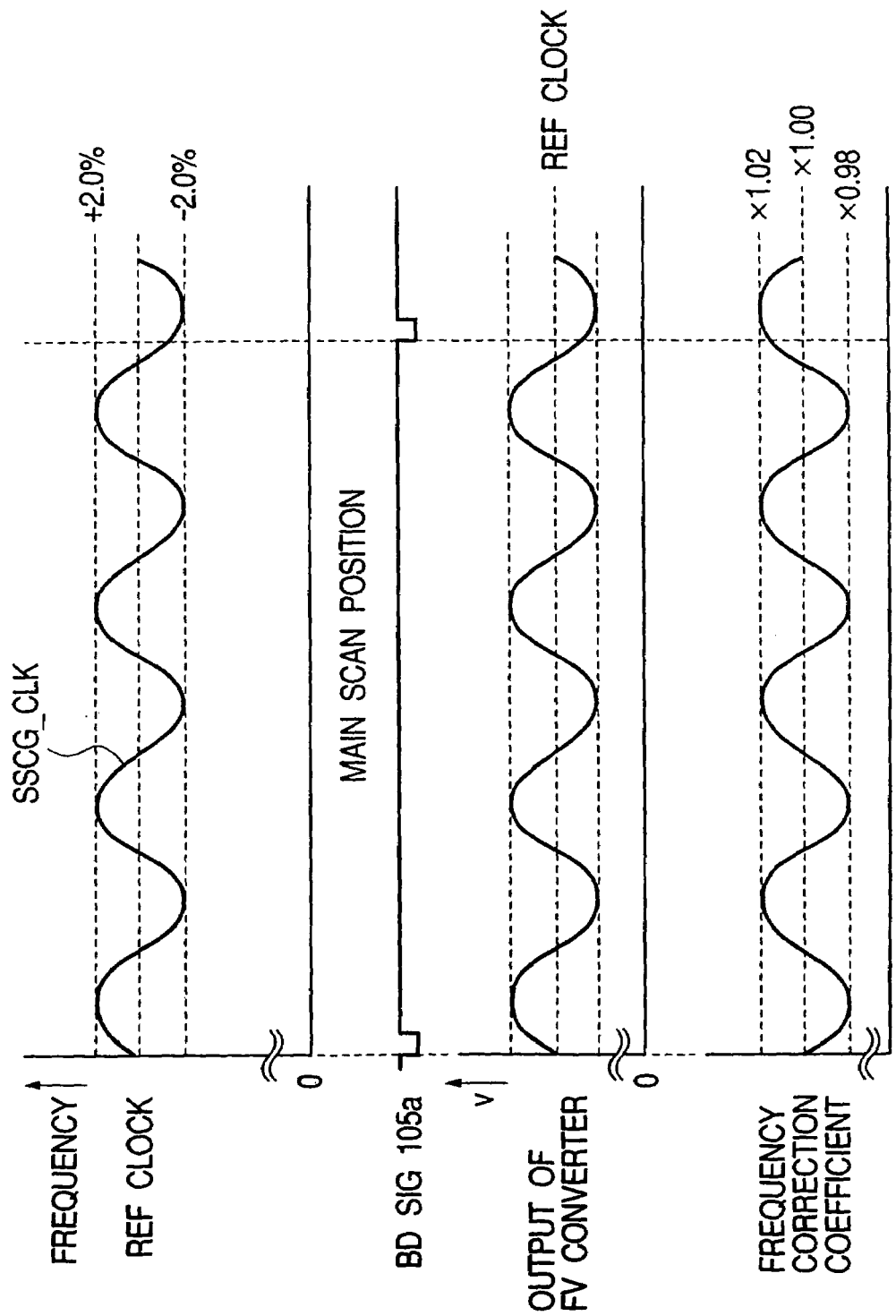
FIG. 14 is a graph representation from a frequency fluctuation of a SSCG-CLK 111 and its conversion into a voltage value by an FV converter till a generation of the frequency correction coefficient.

FIG. 14 is a graphical representation of the fluctuation of the frequency of the SSCG_CLK 111 in FIG. 13, and a process in which the fluctuation is converted into the voltage value by the FV converter so as to generate the frequency correction coefficient.

Figure 15:
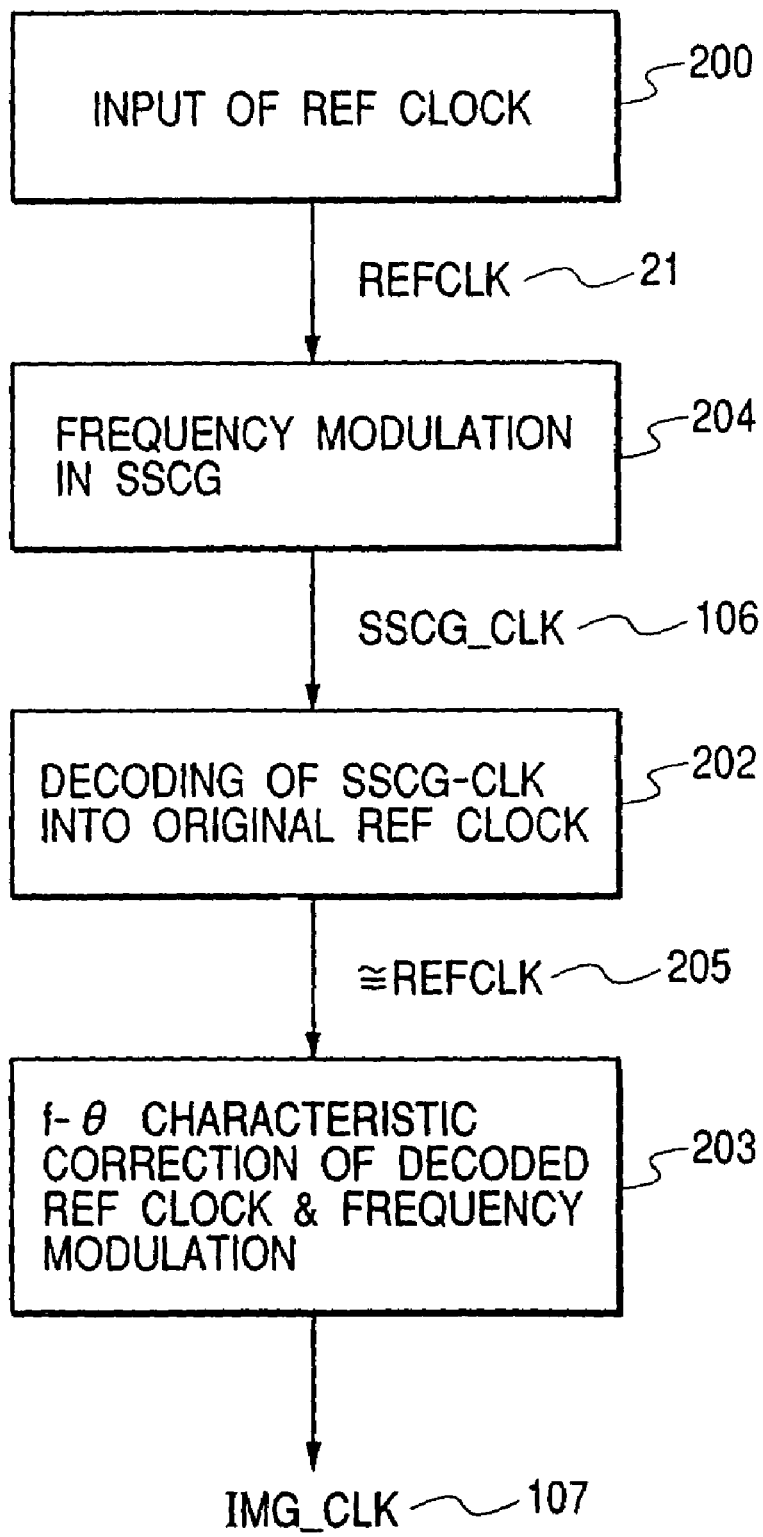
FIG. 15 is a block diagram illustrating a clock flow generated in the circuit configuration of FIG. 13.

Further, FIG. 15 is a block diagram illustrating the flow of the clock generated in the circuit configuration of FIG. 13, and the reference clock (REFCLK) 21 inputted from the reference clock input 200 is frequency-modulated 204 by the SSCG and generates a SSCG_CLK 111. The generated SSCG_CLK 111 is decoded 202 into the frequency approximately close to the reference clock within the PWM-IC, and based on that clock 205, the correction coefficient of the f-θ characteristic is further applied so as to perform the frequency modulation 203, thereby obtaining an IMG_CLK 107.

In this way, by allowing the clock inputted to the PWM-IC to carry the fluctuation by the circuit configurations of FIGS. 10 and 13, the radiation noise generated in the characteristic frequency band of the conventional reference clock can be reduced, and on top of that, the image formation can be made without generating the positional displacement of the image due to the fluctuation of the frequency on the image.

Further, in FIGS. 10 and 13 of the present embodiment, though the color image forming apparatus of the four drum system engine having four exposure units is cited as an example, and the system which lines up four PWM-ICs is described, in the present invention, needless to mention, it is a technology which can be put to practical use whether it is the image forming apparatus of one drum system having one PWM-IC or the image forming apparatus having a plurality of more than four drums.

What is claimed is:

1. A frequency modulation apparatus used in an image forming apparatus having an image bearing body to be scanned by a laser beam, comprising:
   a reference clock generating portion for generating a reference clock having a constant frequency;
   a first frequency control portion for outputting a clock having a predetermined frequency fluctuation, based on the reference clock;
   a second frequency control portion for generating a clock having a constant frequency approximately close to the reference clock, based on the clock having a predetermined frequency fluctuation outputted by said first frequency control portion; and
   a segment dividing portion for dividing a main scan line by the laser beam into a plurality of segments each constituted by a plurality of pixels,
   wherein said second frequency control portion further generates image clocks respectively corresponding to the plurality of segments, based on the clock having a constant clock as generated and modulation coefficients corresponding to respective ones of said plurality of segments.

2. A frequency modulation apparatus according to claim 1, wherein said second frequency control portion includes a holding portion for holding a correction coefficient set so as to reduce the predetermined frequency fluctuation of the clock outputted by said first frequency control portion, and controls the clock having a constant frequency based on the correction coefficient.

* * * * *